United States Patent [19]

Hayashi et al.

[11] Patent Number: 5,703,866
[45] Date of Patent: Dec. 30, 1997

[54] DISK-CHANGING DEVICE WITH RECIPROCATING BACK-SWITCHING STEP CAM PLATES

[75] Inventors: Hideki Hayashi; Yuji Teraguchi, both of Tokyo, Japan

[73] Assignee: Clarion co, Saitame-Ken, Japan

[21] Appl. No.: 475,075

[22] Filed: Jun. 7, 1995

[30] Foreign Application Priority Data

Jun. 24, 1994 [JP] Japan .................................. 6-164836
Jun. 24, 1994 [JP] Japan .................................. 6-164837

[51] Int. Cl.⁶ .................................................. G11B 17/10
[52] U.S. Cl. .................................................. 369/192
[58] Field of Search .................. 369/36–38, 75.1–75.2, 369/77.1–77.2, 178, 192; 360/92, 98.01, 98.04, 99.02, 99.06

[56] References Cited

U.S. PATENT DOCUMENTS 5,084,854  1/1992  Ikedo et al. ............................ 369/75.1
5,245,602  9/1993  Ikedo et al. ............................ 369/75.2

FOREIGN PATENT DOCUMENTS 4103347  9/1992  Japan .

*Primary Examiner*—Stuart S. Levy
*Assistant Examiner*—George J. Letscher
*Attorney, Agent, or Firm*—Price, Gess & Ubell

[57] ABSTRACT

A disk-changing device is disclosed which is able to house a plurality of disk-shaped recording media, and is capable of miniaturization. The recording media are arrayed in one orientation, and the play-back mechanism selects one desired disk, takes it out and performs a predetermined operation such as play-back on the data recorded on the disk. The play-back mechanism is constructed to be capable of movement between the housing positions of the recording media. This movement is based on a plurality of pairs of plate cams which are provided on the inside of the chassis of the device and are able to move reciprocally, and on cam followers which are provided in the play-back mechanism and are inserted into the cams of the plate cams. The shape of the cam is a back-switching stepped shape, with the result that it is constructed in such a way that the amount of movement of the play-back mechanism in the horizontal direction is small. Consequently, the volume of the device as a whole can be kept low.

13 Claims, 8 Drawing Sheets

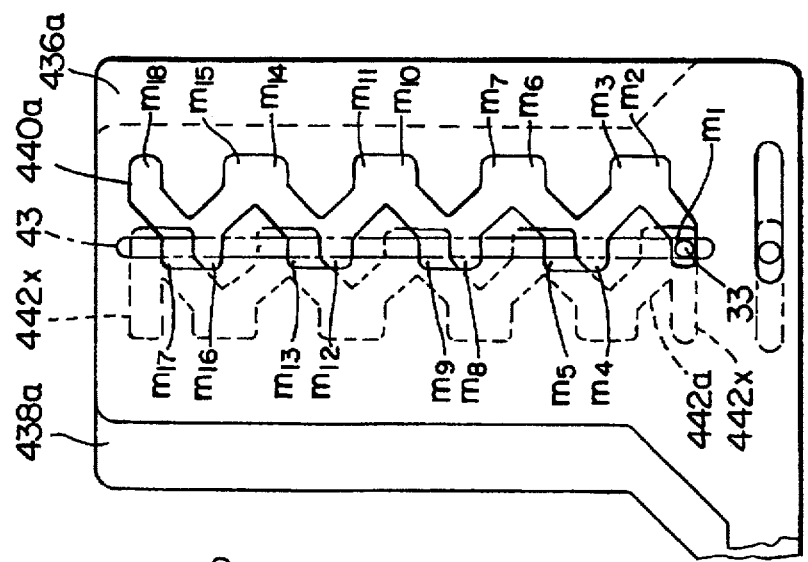
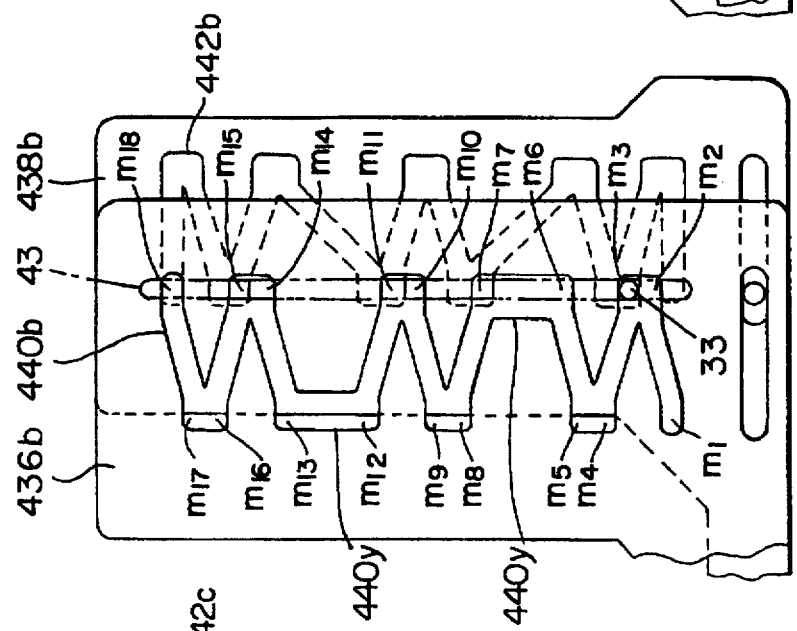
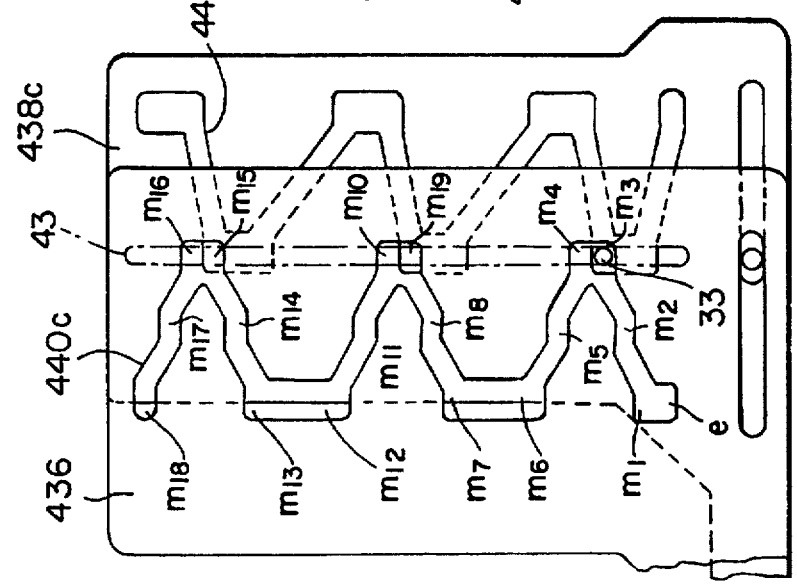

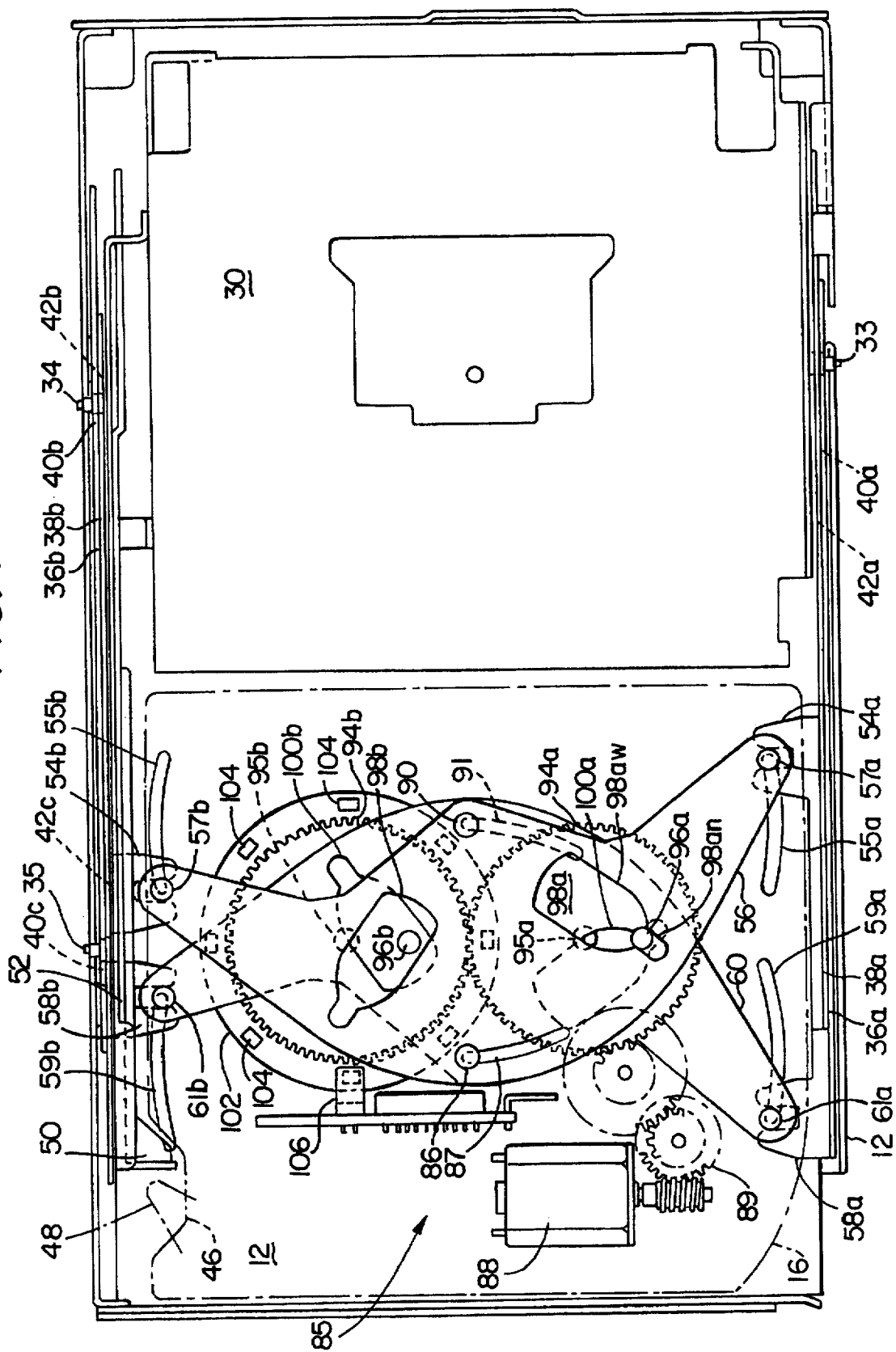

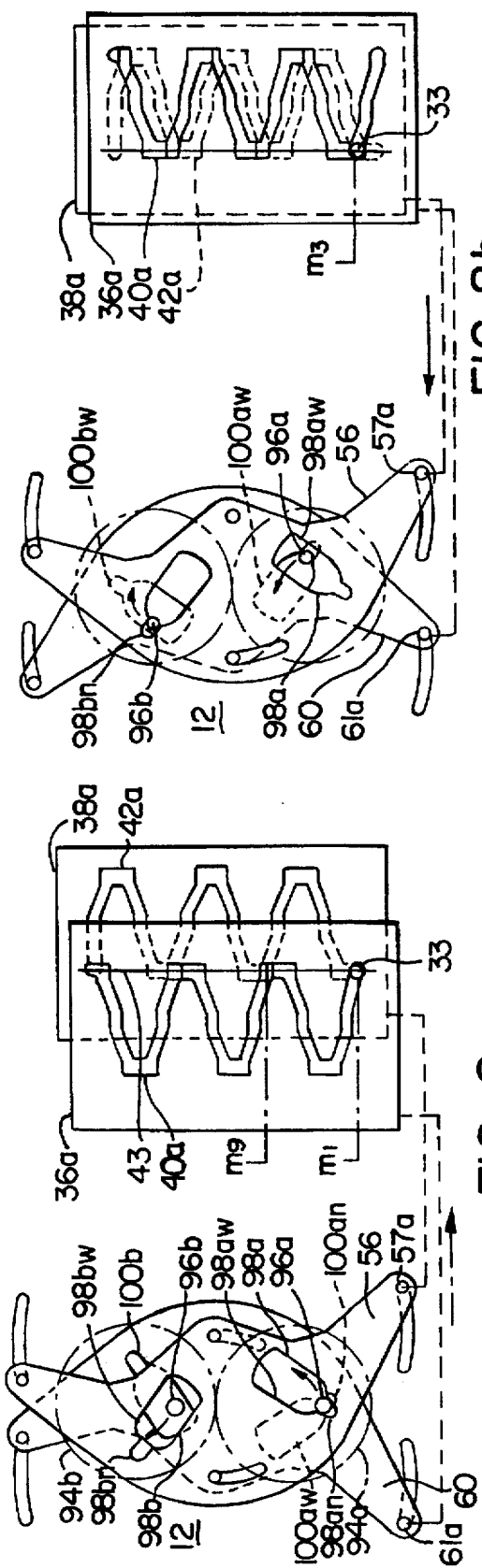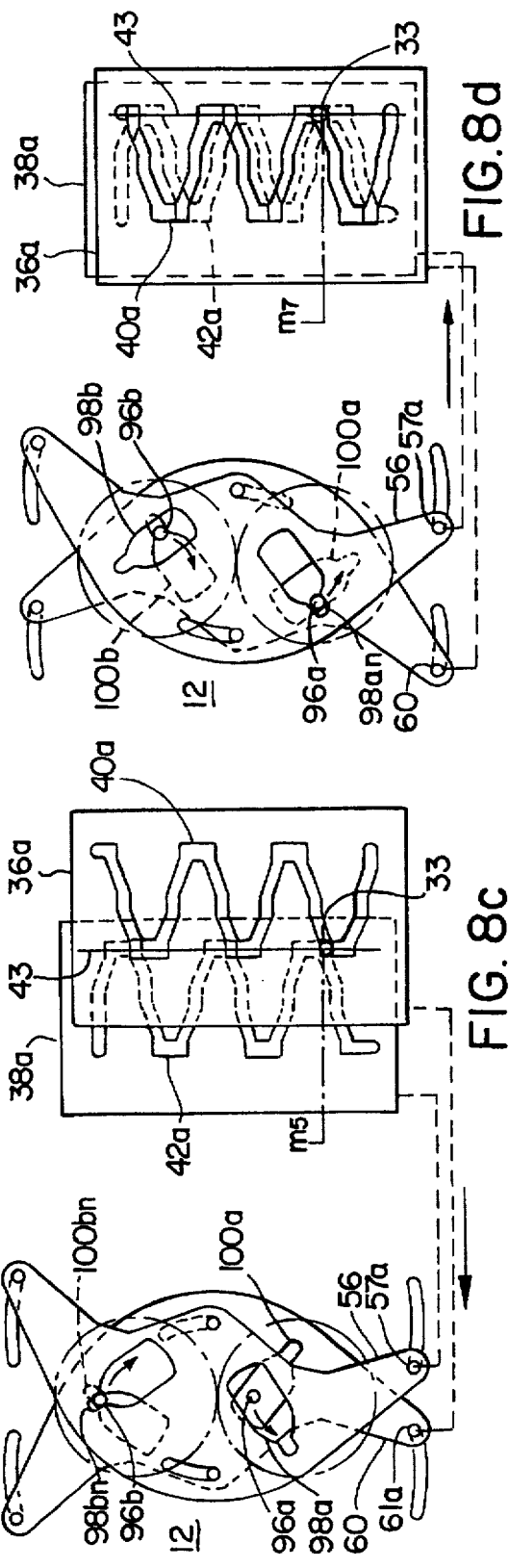

DISK-CHANGING DEVICE WITH RECIPROCATING BACK-SWITCHING STEP CAM PLATES

BACKGROUND OF THE INVENTION

The present invention relates to a disk-changing device for an audio/video type of player which plays back information recorded on a disk-shaped recording medium such as a laser disk or a compact disk, and, more specifically, it concerns an incremental movement mechanism for conveying a play-back mechanism to a desired disk at a certain level, among a number of disks which are housed on a plurality of levels in a stack arrangement along a vertical direction, in order to individually select, extract and play back the desired disk.

As shown in FIG. 1, in a conventional play-back mechanism, the play-back mechanism 505 is moved in increments using a straight-line guide channel 502 provided in a chassis 501 and a stepped channel 504 provided in a plate cam 503 to restrict and control a pin 506 projecting from a part of the play-back mechanism 505. To elaborate, by moving the plate cam 503 reciprocally in the right-angled direction (the X-direction in the figure) with respect to the straight-line guide channel 502, the pin 506 moves reciprocally between the upper limiting position U and the lower limiting position D of the straight-line guide channel 502 while at the same time it moves in increments along the straight-line guide channel 502, controlled by the stepped channel 504. In the figure, the position of the play-back mechanism 505' corresponds to the position of the plate cam 503' shown by the double-dot and chain line. In its course, it stops at each of the horizontal portions 507 of the stepped channel 504, which are at right angles to the guide channel 502. The positions of the stepped horizontal portions 507 correspond to the positions of the levels where the disks are stacked and, therefore, the disk can be extracted from its housing position in a magazine by means of its horizontal movement to the play-back mechanism 505 by a known method and is played back before being returned to the housing position.

By way of another moving mechanism, as published in Japanese Utility Model Publication HEI 4-103347 and as shown in FIG. 2, there is an arrangement which achieves the same effect as with the single plate cam discussed above using a linked-carrying action of two plate cams, in which the stepped channel is divided and allocated between two plate cams 601 and 602.

SUMMARY OF THE INVENTION

However, if there is an elevated number of disks and a large number of housing levels, there is an unavoidable enlargement of the plate cam in the height direction. In addition to this, in both the prior art techniques mentioned above, the dimensions of the plate cam are also enlarged in the lateral direction because the stepped channel will be extended out to the side as viewed in the figure. Thus, in that, for example, play-back players for vehicles in particular are limited as to their volume dimensions, they cannot cope with a large number of disks. The aim of the present invention is to provide a small-scale disk-changing device which is able to cope with large numbers of disks.

For this purpose, according to the invention, there is provided a disk-changing device comprising a housing means (18) having a plurality of housing positions (16), and able to house disk-shaped recording media in each housing position, a loading means (30) which selects and loads a housed recording medium from a desired housing position in the abovementioned housing means, a plurality of pairs of plates (36ab and 38ab) which move the abovementioned loading means between each of the abovementioned housing positions, zig-zag shaped cams (40abc and 42abc) are formed on the plates and are positioned approximately horizontally with a freedom of reciprocal movement, pin-shaped cam followers (33, 34 and 35) are provided on the loading means and are constructed in such a way as to be inserted in the abovementioned zig-zag shaped cams, and a movement means (85) which reciprocally moves the plurality of plates with a predetermined timing with the result that it moves the loading means in a direction perpendicular to the direction of movement of the plurality of plates.

With the disk-changing device of the present invention, when the first and second plates are moved reciprocally by the moving device, the disk selection device, engaged with the above-mentioned cam, moves incrementally to arrive at the position in which the desired disk can be selected.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 6 shows front views of other embodiments of the plate cam of the disk-changing device according to the present invention, (a) being a second embodiment, (b) being a third embodiment, and (c) being a fourth embodiment.

FIG. 7 is a horizontal view of one example of a drive device used in the present invention, taken along the line VII—VII in FIG. 3.

FIG. 8 shows explanatory drawings of drive modes of the plate cam of the abovementioned drive device.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an improved disk-changing device.

Figure 1:
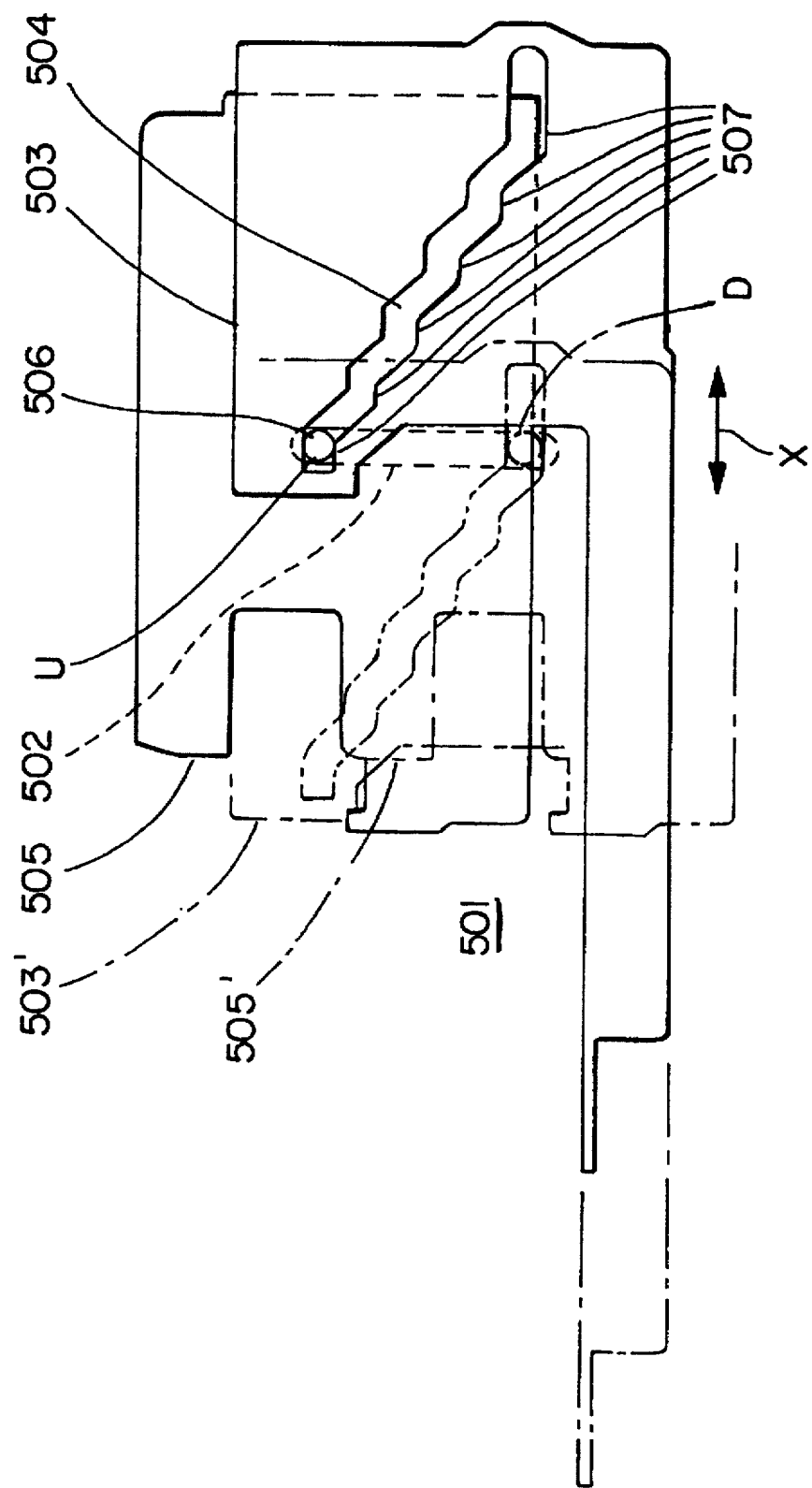
FIG. 1 is a front view of a plate cam of an embodiment of the prior art.
Figure 2:
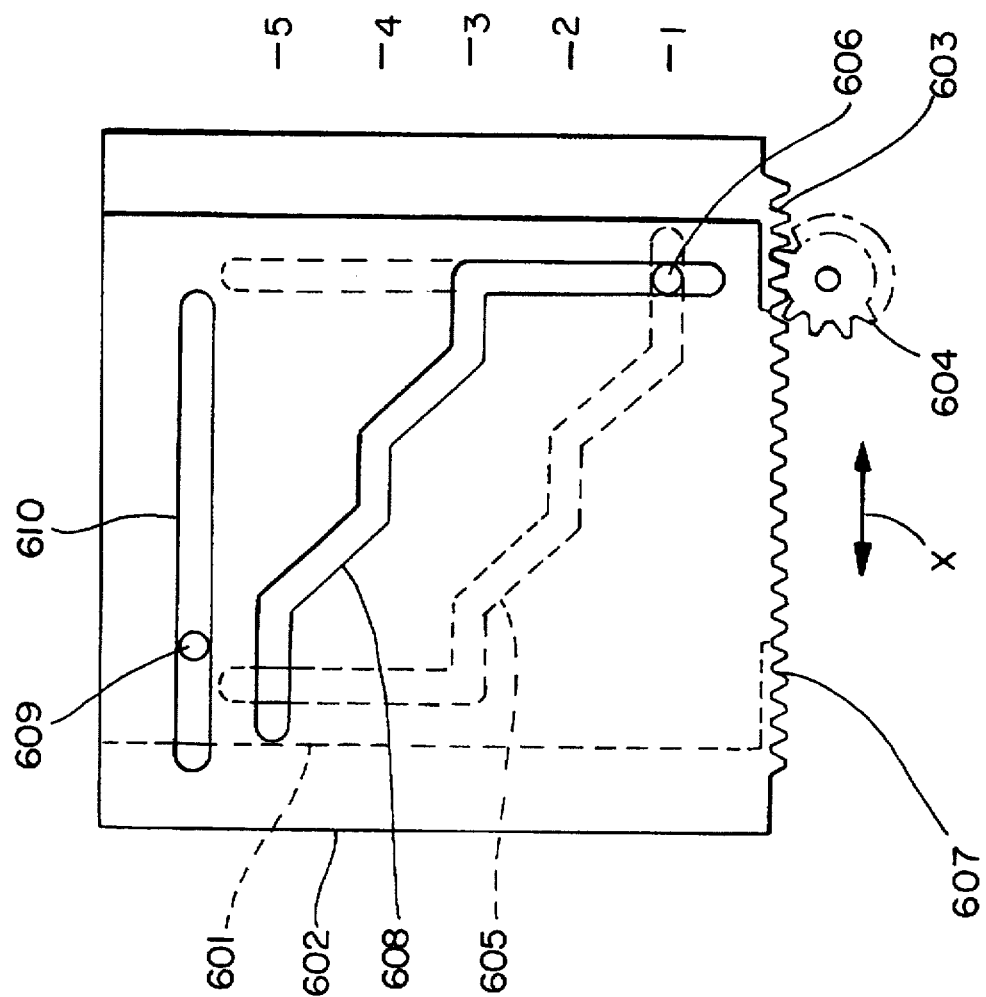
FIG. 2 is a front view of a plate cam of another example of the prior art.
Figure 3:
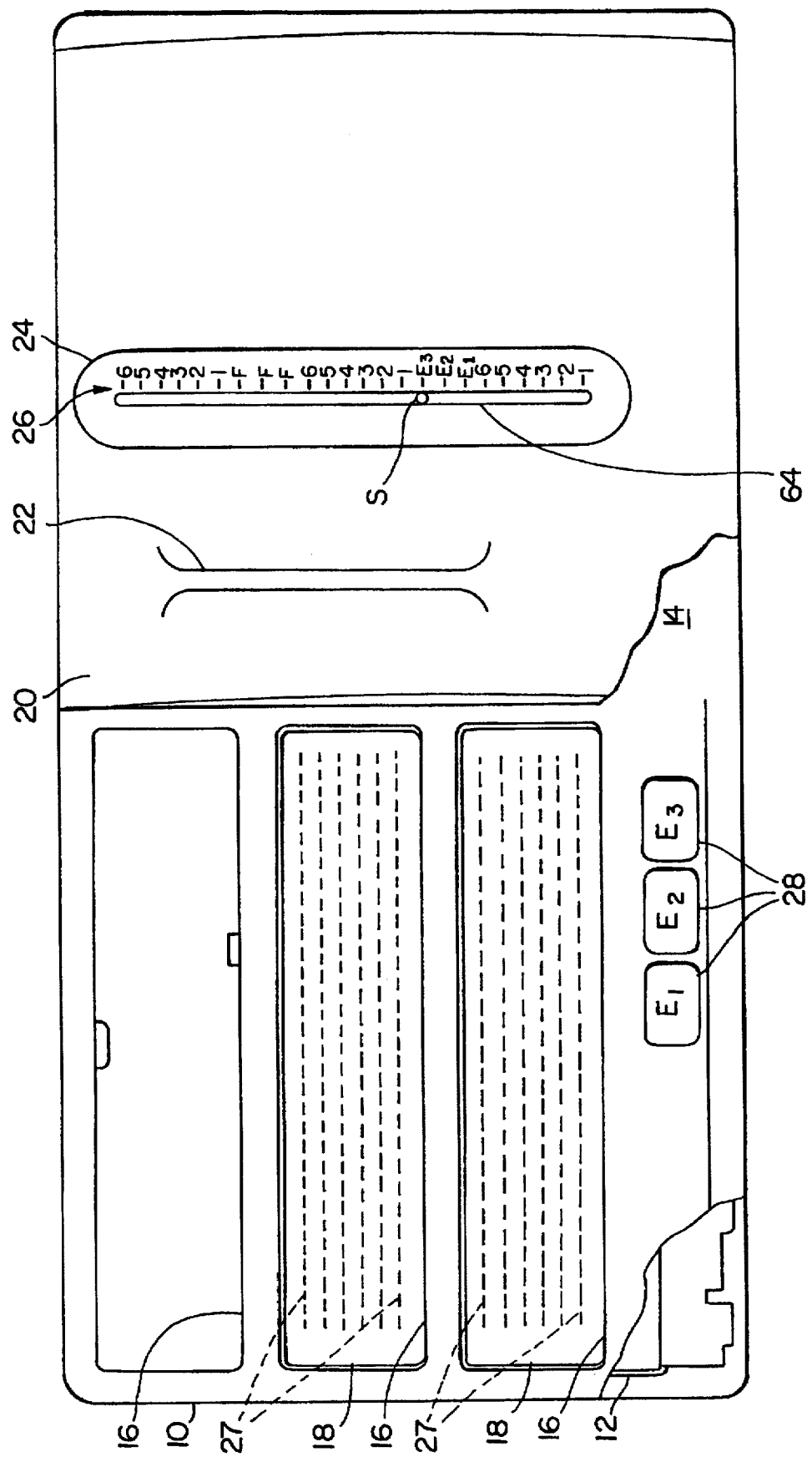
FIG. 3 is a front view of an outline of a first embodiment of a disk-changing device according to the present invention.

Embodiments of the present invention are described below with reference to the drawings. Identical references have been used for parts which are common throughout the drawings. FIG. 3 is a simplified front view of a disk-changing device according to the present invention, 10 being the casing, 12 the chassis, 14 the control panel, and 16 the magazine housing shelves, three magazines being distributed on three levels to allow storage of disks. In the depiction in the figure, magazines 18 are installed housed in the magazine housing shelves 16 on the lower two levels, and the top-most level is empty without any magazine being installed in it. 20 is a sliding door which opens and closes the magazine housing chamber, and in the figure it is in the position in which the magazine housing shelves 16 are opened. 22 is the opening-and-closing handle of the sliding door 20 and 24 is a viewing window which is provided through the sliding door 20 to allow an external visual check of the indicator 26, provided in the control panel 14, for checking the position of the selected disk. In the case depicted, the pointer S of the indicator 26 shows that the mechanism is in the operation position (marking=$E_3$) for ejecting the magazine in the magazine housing shelf 16 at the top-most level. For the sake of convenience, this embodiment depicts an example of a player in which three magazines 18 are each able to accommodate six disks 27, allowing control of a total of eighteen disks, but it goes without saying that the number of magazines and the number of disks which can be accommodated in the magazines is not limited to this specific number.

The control switches provided in the control panel 14 are screened by the other portions of the sliding door 20 and are protected from erroneous operation due to uncalled-for contact. 28 are eject control buttons respectively corresponding to the magazine housing shelves, and a desired magazine can be taken out by pressing one of these. A magazine is fitted by pressing the magazine well back in the desired shelf position, and, at the end of this pressing operation, the magazine is automatically locked and held in this position by a well-known method. Upon operating the opening-and-closing handle 22 and opening the sliding door 20 in this way, completing the operation of fitting or removing the magazine and closing the sliding door 20, the control panel 14 is exposed to the front at the right in the figure, and the operation of playing back a disk 27 can be carried out. It should be noted that, with this changing device, only the eject control buttons 28 need be provided and control switches need not be provided on the panel given the reference 14. In this case, various commands for the changing device such as disk changing and play-back are carried out from a head unit, which is not depicted, connected to the changing device.

Figure 4:
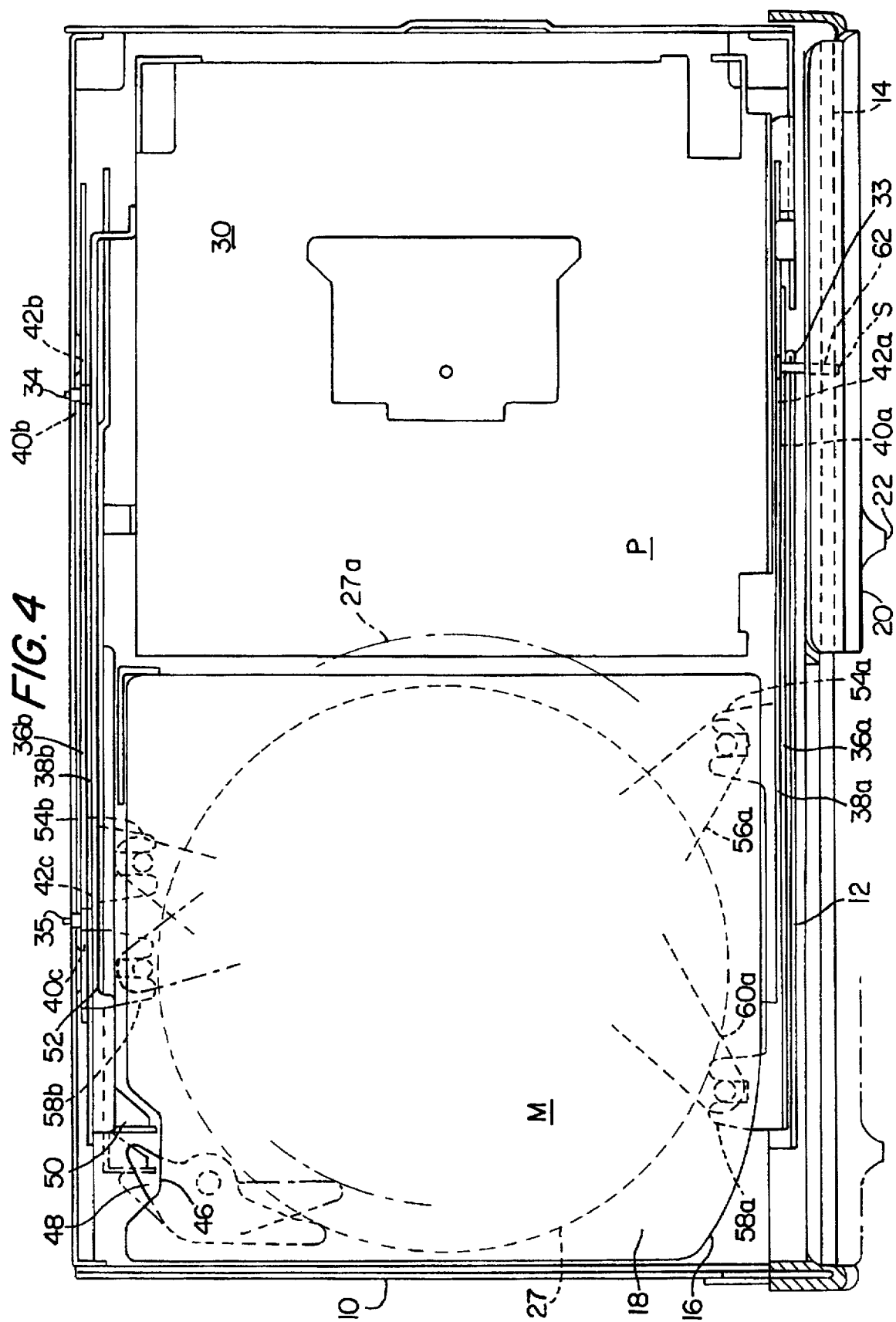
FIG. 4 is a horizontal cross section along the line II—II in FIG. 3.

FIG. 4 is a horizontal cross section along the line II—II in FIG. 3, in which M is the magazine housing unit and P is the disk play-back unit. 30 is a lift panel on which the disk select and play-back device is mounted, on which three shift pins 33, 34 and 35 are integrally planted, which is supported by zig-zag shaped stepped cam channels 40a and 42a provided on a first plate cam 36a and a second plate cam 38a on the side of the control panel 14 at the front, and by zig-zag shaped stepped cam channels 40b, 40c, 42b and 42c provided in two sites distanced laterally respectively on the first plate cam 36b and the second plate cam 38b to the back, and which is guided vertically by a straight-line guide channel 43 (FIG. 5) provided in the chassis 12.

The abovementioned cam channels 40a (FIG. 5), 40b, 40c, 42a (FIG. 5), 42b and 42c are respectively formed in a stepped shape having horizontal regions ($m_2$, $m_6$ . . . ) along the course of portions formed at an incline, and the inclined portions are formed in a zig-zag shape which reverses between left and right.

The shapes of the zig-zag shaped stepped cam channels 40a, 40b and 40c provided in the first plate cams 36a and 36b are all identical and repetitively reverse direction as they extend across the respective flat plate cam member. The cam channel 40a is formed on the plate cam 36a, and the stepped cam channels 40b and 40c are formed on the plate cam 36b. In addition, the shapes of the zig-zag shaped stepped cam channels 42a, 42b and 42c provided in the second plate cams 38a and 38b are also all identical. The cam channel 42a is provided on the plate cam 38a, and the stepped cam channels 42b and 42c are provided on the plate cam 38b.

The plan form of the magazine housing shelves 16 is roughly the same shape as the magazine 18, and they have on their upper surfaces locking and ejecting mechanisms, which are not shown, which lock and eject the magazines 18 in their housing positions. Also, the magazine housing shelves 16 are provided with cut-away portions 46 in the same shape as and in the same position as in the magazine 18, and the operating key 50 for levers 48 which eject disks and are provided continuously in the magazine 18 runs through this cut-away portion 46 in the vertical direction.

The operating key 50 is linked by an arm 52 to a drive unit which is not depicted but is provided on the lift panel 30, and rises and falls together with the lift panel 30. By operating the operating key 50 so that it projects to the left, depicted by the double-dot and chain line in FIG. 4, the disk ejection lever 48 at the same height as the operating key 50 is rotated counterclockwise, and only the disk 27a which is engaged with it is pushed out in the direction of the disk play-back unit P up until it is in the position shown by the double-dot and chain line in the figure, and it is set in the disk play-back unit P by a known means. Further, the arrangement is such that when the operating key 50 is set in any of the levels $E_1$, $E_2$ or $E_3$ where the disk ejection levers 48 do not play a role, it can operate a magazine eject lever provided in the locking and ejection mechanism mentioned above with the same action as on the disk ejection lever 48.

In FIG. 4, 54a is the coupling between the first plate cam 36a and the drive lever 56a, and the first plate cam 36a is operated reciprocally by the swing action of the drive lever 56a. Opposite this, the first plate cam 36b at the back is also provided with a coupling 54b which engages with a lever integral with the drive lever 56a and extending in the opposite direction to move it reciprocally.

Meanwhile, 58a is the coupling between the second plate cam 38a and the drive lever 60a, and the plate cam 38a is operated reciprocally by the swing action of the drive lever 60a. Opposite this, the second plate cam 38b at the back is also provided with a coupling 58b which engages with a lever integral with the drive lever 60a and extending in the opposite direction to move it reciprocally. The first plate cams 36a and 36b at the front and back experience simultaneous relative movement due to the rotation of the drive lever 56a and thereby cause the same simultaneous action at all three of the shift pins 33, 34 and 35 due to the stepped cam channels 40a, 40b and 40c. Similarly, with the second plate cams 38a and 38b at the front and back as well, the stepped cam channels 42a, 42b and 42c cause the same simultaneous action on all three of the shift pins 33, 34 and 35 due to the rotation of the drive lever 60a.

76a and 76b (FIG. 5) are straight-line guides for moving the first plate cams 36a and 36b reciprocally and in line to left and right, while 78a and 78b are straight line guides for moving the second plate cams 38a and 38b reciprocally and in line to left and right; all of them performing an oscillating action engaged with the stud pins 80 and 82 fixed to the chassis. 62 is a pin formed by extending the shift pin 33, the end of which is used as the pointer S of the indicator 26, it is inserted through the elongated hole 64 of the indicator 26 provided in the control panel 14, and the operator can visually check the position of this pointer S from the outside to check which disk 27 the lift panel 30 corresponds to in terms of housing level.

Figure 5:
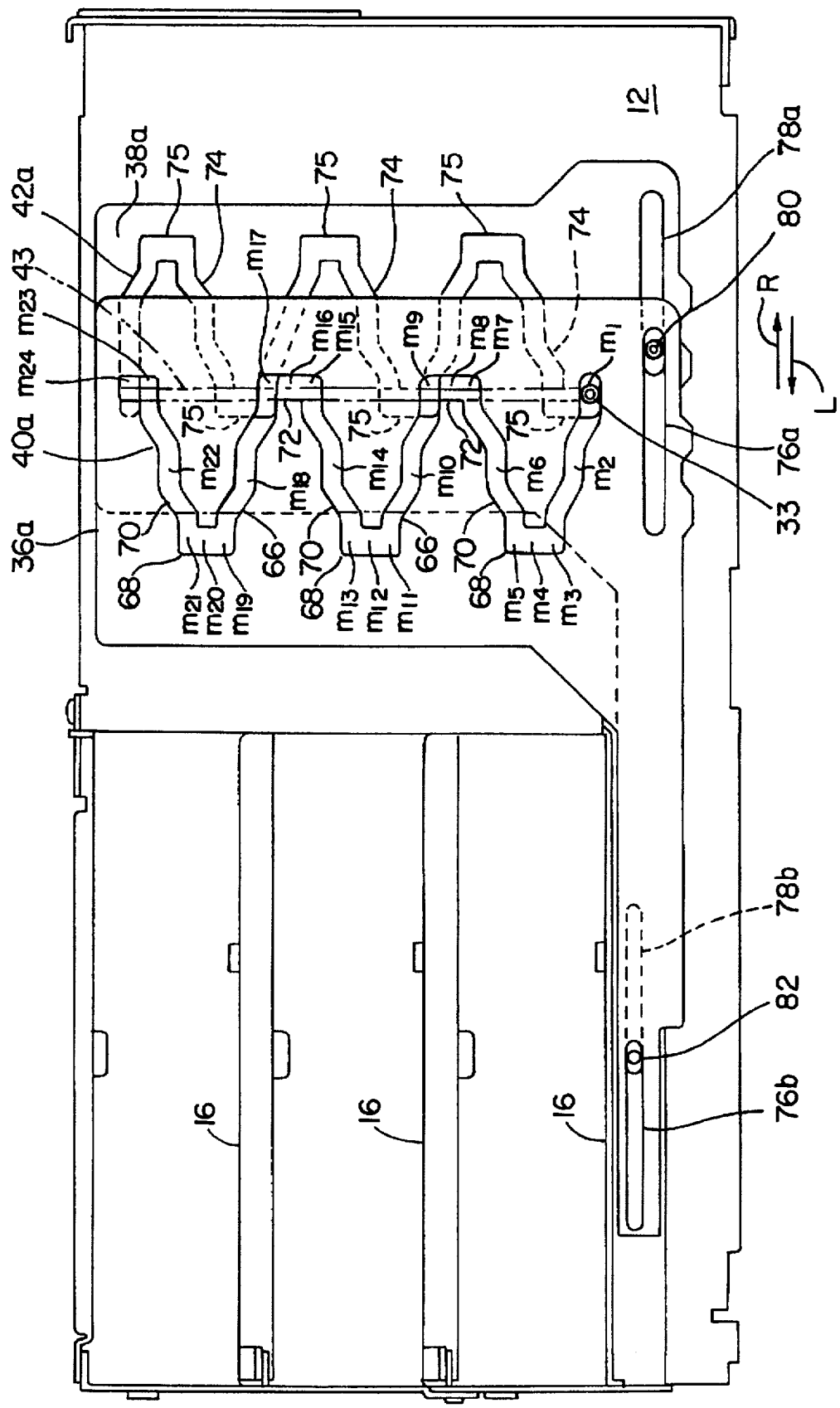
FIG. 5 is a front view of a plate cam of a first embodiment along the line III—III in FIG. 4.

FIG. 5 is a front view of the first plate cam 36a and the second plate cam 38a, taken along the line III—III in FIG. 4, in which a zig-zag shaped stepped cam channel 40a is provided in the first plate cam 36a and another zig-zag shaped stepped cam channel 42a is provided in the second plate cam 38a. For the sake of convenience in this description, the switch-backs to the left of the zig-zag shaped stepped cam channel 40a in the first plate cam 36a will be termed crests while the switch-backs to the right will be termed troughs. The zig-zag shaped channel 40a comprises a succession of steps 66 running upward the troughs to the crests, steps 68 running only on the crest side, steps 70 running from the crests to the troughs, and steps 72 running only on the trough side. In this first embodiment, the second plate cam 38a also has a zig-zag shaped cam portion, it being arranged so that the inclined portions 74 of the stepped cam channel 42a correspond to the successively provided steps 68 and 72 on the first plate cam 36a, and the run between these steps 68 and 72 is assisted by the second plate cam 38a: the stepped cam channel 42a of the second plate cam does not necessarily have to be stepped or of a zig-zag shape.

Next the incremental movement of the lift panel 30 is described with reference to the action of the first and second plate cams 36a and 38a with respect to the shift pin 33. The explanation of the other pins 34 and 35 is omitted since they perform in exactly the same way due to the stepped cam channels 40b, 42b, 40c and 42c of the first and second plate cams 36b and 38b which engage therewith. Each of the plate cams performs an intermittent reciprocal movement between the crests and troughs of the zig-zag shape under the action of the drive levers 56a and 60a which are electrically and/or mechanically controlled.

It is assumed that to begin with the lift panel 30 is in the bottom position $m_1$ (control panel marking=1: referred to as marking=1 hereinbelow). With the second plate cam 38a ("cam 38a" hereinbelow) stopped, the first plate cam 36a ("cam 36a" hereinbelow) moves in the direction of the arrow R and stops in the half-stroke position. The position where the shift pin 33 engages with the cam channel 40a is $m_2$, and the shift pin 33 stops in the position of marking=2. Upon moving the cam 36a in the direction of the arrow R for a full stroke, the position where the shift pin 33 engages with the cam channel 40a reaches $m_3$, and the shift pin 33 is positioned at marking=3. During this action, it is in position 75 of the cam channel 42a of the cam 38a involving no interference at all.

Next, with the cam 36a stopped, the cam 38a is moved in the direction of the arrow L and is stopped in the half-stroke position. The position where the shift pin 33 engages with the cam channel 40a is $m_4$, and the shift pin 33 stops positioned at marking=4. If the cam 38a is moved further in the direction of the arrow L to the full stroke position, the position where the shift pin 33 engages with the cam channel 40a is $m_5$, and the shift pin 33 is positioned at marking=5. Then, by stopping the cam 38a and stopping the cam 36a in the half-stroke position, the shift pin 33 engages with the cam channel 40a at $m_6$, so that the shift pin 33 stops positioned at marking=6. Then the cam 36a is moved further to the full stroke position, the shift pin 33 engages at $m_7$ of the cam channel 40a and the shift pin 33 is positioned at marking=$E_1$. During this action, the cam channel 42a of the cam 38a is in position 75 at which it does not interfere with the movement of the shift pin 33 at all. Thus the shift pin 33 advances by increments in one direction in the straight-line main guide channel 43. The shift pin 33 can be advanced in reverse by reversing the above procedure.

Markings 1 to 6 correspond to the housing levels of the disks 27 in the lower level magazine 18, and by stopping the shift pin 33 in the required level position and locking it in this position using a separately established method, and operating the operating key 50 of the disk ejection lever 48 by a command from the operating panel 14 for the lift panel 30 which has reached the same level as the required disk 27, a known means can be used to eject the disk 27 from its housed position, play it back and then, after use, to return it to its housing position.

Then, with the cam 36a stopped, the cam 38a is moved in the direction of the arrow R and is stopped in the half-stroke position. The position where the shift pin 33 engages with the cam channel 40a is $m_8$, and the shift pin 33 stops positioned at marking=$E_2$. If the cam 38a is moved further in the direction of the arrow R for a full stroke, the position where the shift pin 33 engages with the cam channel 40a is $m_9$, and the shift pin 33 is positioned at marking=$E_3$. At the positions $m_7$, $m_8$ and $m_9$ corresponding to the markings $E_1$, $E_2$ and $E_3$, a space where there is no disk is created by the thickness of the magazine housing frame and the magazine case. The magazine eject operation is then performed by providing ejection levers which can be operated by the operating key 50 in this level position so as to correspond to the marking positions $E_1$, $E_2$ and $E_3$ at each magazine housing level.

The above involved an operation for disks in a magazine fitted in the top level, but the aim of getting the lift panel 30 to correspond to each individual disk housing position can be achieved by repeating the same operation with the cam 36a and the cam 38a for disks in magazines fitted in the middle level and the top level as well. The three step positions $m_{16}$, $m_{17}$ and $m_{18}$ (markings=F, F, F) between the middle level magazine and the top level magazine are dead space where there are no particular functional parts operated by the operating key 50 or the like, and there is therefore no need to provide steps in between, and the device is controlled in such a way that, when the shift pin 33 is in this position, the cam 38a moves a complete stroke without stopping.

Other embodiments of the first and second plate cams are now described based on FIG. 6. FIG. 6 (a) shows a second embodiment involving an applied example in which the disk housing levels are all at equal intervals. The cam channels 440a and 442a formed in the first and second plate cams 436a and 438a do have a zig-zag shape but are not formed in a stepped shape. Movement of the first plate cam 436a to the left causes the position where the shift pin 33 engages with the zig-zag shaped cam channel 440a to move from $m_1$ to $m_2$, then further movement of the facing second plate cam 438a to the right causes it to be pushed up against the inclined portion of the cam channel 442a so that the position of engagement becomes $m_3$, and then the position of engagement moves to $m_4$ upon movement to the right of the plate cam 436a returning to the position depicted. Next, the return of the plate cam 438a to the position depicted brings the position of engagement of the shift pin 33 to $m_5$. In this way the shift pin 33 is moved incrementally along the straight-line guide channel 43.

By subsequently repeating this action of the plate cams 436a and 438a, the shift pin 33 passes through engagement positions $m_6, \ldots, m_{17}$ to reach the top-most end position $m_{18}$. In other words, the stopping positions of the shift pin 33 correspond to 18 disks at $m_1, \ldots, m_{18}$. The fact that these stopping positions correspond to the housing levels of the disks, that the desired operation can be carried out on the required disk in a stopping position, and that the raising and lowering action can be carried out freely from any desired position are exactly the same as in Embodiment 1. Thus, in this second embodiment, a correspondence with eighteen disks was arranged with this incremental movement mechanism simply by reciprocally moving the plate cams 436a and 438a a slight distance.

In this way, a play-back player can cope with a large number of housed disks without increasing its dimensions in the lateral direction. Further, by providing the horizontal portions 442x at right angles to the straight-line guide channel 43 at the ends of the zig-zag channel 442a the plate cam 438a can be further displaced while the shift pin 33 is stopped at the end of the range of its run, and this movement can be used as an action signal, such as a reset signal for resetting another part in the device, or can be made to correspond to an action, such as an ejection operation.

Furthermore, FIG. 6 (b) depicts a third embodiment in which the straight-line portion 440y has been formed with the step intervals between the crests of the zig-zag shaped cam channel 440b partially increased. The first plate cam 436b and the second plate cam 438b are alternately moved reciprocally to left and right, and the two cam channels 440b and 442b are used to incrementally advance the shift pin 33 along the straight-line guide channel 43, which is as in the second embodiment. In FIG. 6 (b), there are equal step intervals between the stopping positions $m_1$ to $m_6$, $m_7$ to $m_{12}$ and $m_{13}$ to $m_{18}$ where the shift pin 33 engages with the zig-zag shaped cam channel 440b, and each corresponds to the housing intervals of six disks in each magazine. Meanwhile, there are increased intervals for $m_6$ and $m_7$ as well as $m_{12}$ and $m_{13}$ in the stopping position, and this corresponds to the spaces where there are no disks, which are created by the thickness of the magazine housing frame and the magazine case.

Further, FIG. 6 (c) is a fourth embodiment in which the mid course stopping positions $m_2$, $m_3$, $m_8$, $m_{11}$, $m_{14}$ and $m_{17}$ are set by dividing up the run steps between the crests and the troughs of the zig-zag shaped cam channel 440c, so that the cam channel 440c is constructed with a stepped shape. Horizontal portions are provided in the portions of the stepped cam channel 440c where the plate cam 436c is temporarily stopped in the mid course of its reciprocal movement. Otherwise, the process is carried out in the same way as in the embodiments discussed above in that the shift pin 33 is incrementally advanced inside the straight-line guide channel 43 with the aid of the second plate cam 442c. Additionally, the disk housing intervals and the intervals spaced by the housing shelves between magazines are set in the same way as in the third embodiment. Moreover, in this fourth embodiment, there are fewer zigzag convolutions than in the second and third embodiments even though the number of disks handled is the same, and a mechanism for detecting the middle of plate cam strokes and sending out a stop signal is provided separately as in the first embodiment. Further, the channel e projecting even further down from the bottom end position $m_1$ is the position to which the lift panel 30 moves, which lift panel is designed to operate another part such as an eject lever or the like provided below the bottom-most disk position, using a mechanism such as an operating key or the like provided in the disk selection and play-back means.

Such aspects as the zig-zag-shape of the cam channel, the step intervals, and the end shape of the cam channel are not limited to the above embodiments and it goes without saying that various modifications and adaptations are possible in view of design considerations in disk play-back players. More specifically, the pair of cam channels provided in the first and second plate cams were both zig-zag shaped stepped channels in the first embodiment, they were both zig-zag shaped channels in the second and third embodiments, and one was a zig-zag shaped channel and the other a zig-zag shaped stepped channel in the fourth embodiment, but only one of the cam channels need be zig-zag shaped and the other need not have a zig-zag shape but need only be an inclined channel or a stepped channel.

Further, the disk may be of any type, for example CD (compact disk), or LD (laser disk), or one housed in a cassette, such as an MD (mini disk) or FD (floppy disk). Also, examples were adopted in which the disks were housed in magazines, but the present invention may also be employed in systems in which the disks are not housed in magazines but are housed directly in the disk device.

An explanation of the drive mechanism of the cams 36a and 38a now follows. FIG. 7 is a plan view of one example of a drive device 85 for the first and second plate cams, taken in cross section along the line VII—VII in FIG. 3. 94a and 94b are gear wheels of equal diameter which mesh with each other and which are operated from a controlled drive motor 88, via the step-down gear train 89 to turn forward, turn backward or stop. 96a and 96b are work pins which are respectively planted in the gear wheels 94a and 94b. 56 and 60 are drive levers which are respectively free to rotate about the shafts 90 and 86. Further, the shafts 86 and 90 are positioned on a tangent to where the gear wheels 94a and 94b mesh and symmetrically on either side of a line joining the gear wheel shafts 95a and 95b. The two drive levers 56 and 60 have the same shape and are positioned facing each other lying over the gear wheels 94a and 94b. 87 and 91 are escape channels respectively formed in the drive levers 56 and 60, and are provided so that the movement of the drive levers 56 and 60 is not impeded by the shafts 86 and 90.

Further, the drive levers 56 and 60 have in them cam holes 98a, 98b; 100a and 100b which are run through and touched on the inside by the work pins 96a and 96b. Each of the cam holes is constructed with a shape in which a thin elongated hole portion n and a wide elongated hole portion w are connected in the length direction. Each of the work pins 96a and 96b engages with the thin elongated hole portions n, but is in a loose state in the wide elongated hole portions w. The regions of the elongated holes with different widths are referred to hereinbelow by adding an n or a w to the cam hole references.

With the drive levers 56 and 60, the pins 57a and 61a planted in one end engage with the coupling 54a and the coupling 58a provided integrally with the second plate cam 38a and the first plate cam 36a at the front to move the first plate cam 36a and the second plate cam 38a reciprocally and individually. Opposite, a coupling 54b and a coupling 58b which respectively engage with the pins 57b and 61b planted at the other ends of the drive levers 56 and 60 are also provided on the second plate cam 38b and the first plate cam 36b at the back in order to move them reciprocally.

The front and back first plate cams 36a and 36b move simultaneously relative to one another due to the drive lever 56 rotating, and the stepped cam channels 40a, 40b and 40c cause all three shift pins 33, 34 and 35 to perform the same actions simultaneously. Further, the second plate cams 38a and 38b move simultaneously relative to one another due to the drive lever 60 rotating, and, in the same way, the stepped cam channels 42a, 42b and 42c cause all three shift pins 33, 34 and 35 to perform the same actions simultaneously in the front and back second plate cams 38a and 38b.

55a, 55b: 59a and 59b are arc channels provided in the chassis 12, they are run through by the bottom ends of the pins 57a, 57b: 61a and 61b and guide their sliding motion, in addition to which they sandwich and hold, to the extent of the plate thickness, the chassis using the flange areas where the end portions of the pins 57a, 57b: 61a and 61b have been enlarged and they thereby stabilize the motion of the drive levers 56 and 60.

102 is a turning disk which turns integrally with the gear wheel 94b and which is provided around its circumference with eight small holes 104, . . . , 104 at equal intervals. 106 is a photoelectric element which generates a signal of 1 pulse each time a small hole 104 is directly opposite. The pulses are counted by a means such as an up/down counter and the resulting data is used as the basis for control of the drive member in a comparison with an external input. More specifically, one turn of the turning disk 102 corresponds to eight pulses, and each pulse-generating position shows a one-to-one correspondence with a phase of the two drive levers, and it is therefore possible to stop the two drive levers in a specific phase by turning the gear wheel 94b forward or backward until it reaches a position of equilibrium with the number of pulses input from the outside. As will be discussed hereinbelow, the housing level intervals of the disks 27 are set to correspond with the pitch between the small holes 104.

The action of the drive device 85 discussed above and the incremental movement of the lift panel 30 due to said drive device 85 are now discussed in detail with reference to FIG. 8, taking as an example the action of the first and second plate cams 36a and 38a with respect to the shift pin 33. As regards the other pins 34 and 35, the stepped cam channels 40b, 40b: 42c and 42c of the first and second plate cams 36b and 38b which engage with them operate in exactly the same way by linked motion with the action of the drive levers 56 and 60, and a description of these has therefore, been omitted.

Now, if in FIG. 8 (a) it is taken that the shift pin 33 which incrementally advances the disk selecting means toward the stacked disks is in the bottom-most level position $m_1$, and the gear wheel 94a is rotated counterclockwise for example, then the work pin 96b, which turns clockwise due to the meshing gear wheel 94b, is in a loose state visa vis the cam holes 98b and 100b and does not interfere with the movement of the drive levers in any way, whereas the work pin 96a is released from engagement with the cam hole 98an and shifts to engagement with the cam hole 100an. Thus, the drive lever 56 stops rotating, the drive lever 60 starts rotating in the counterclockwise direction and the state shown in FIG. 8 (b) is reached. This means that, because only the plate cam 36a moves to the right in the figure and the plate cam 38a is stopped, the shift pin 33 rises to position $m_3$ along the straight-line guide channel 43. Moreover, as discussed previously, when the engagement between the pin 96a and the cam hole 98an is released, the drive lever 56 stops rotating, but in addition to this the pin 96a subsequently moves along the curved area of the cam hole 98aw (the arced area provided to the side 98an) and the other pin 96b moves along the curved area of the cam hole 98bw (the arced area provided to the side 98bn), and the drive lever 56 is stopped stably rather than shakily.

If the turning of the gear wheels 94a and 94b is advanced further from the situation in FIG. 8 (b), then the work pin 96a will move to the region of the cam hole 100aw, and the drive lever 60 will therefore stop rotating. Moreover, as discussed previously in relation to FIG. 8 (a), because the pins 96a and 96b respectively move to the curved areas of the cam holes 100aw and 100bw, the drive lever 60 is stopped stably.

Meanwhile, the other work pin 96b engages in the cam hole portion 98bn, the drive lever 56 rotates in the clockwise direction, and the plate cam 36a is stopped, in which state the plate cam 38a moves to the position in FIG. 8 (c) and the shift pin 33 therefore rises to the position $m_5$. At this time, the work pin 96a is in the loose state in the cam hole 98aw and does not interfere with the movement of the drive lever 56.

If the gear wheels 94a and 94b are turned further from the state in FIG. 8 (c), the work pin 96b is freed from engagement with the cam hole 98bn and engages with the cam hole 100bn, the drive lever 60 rotates in the clockwise direction to assume the state in FIG. 8 (d), and the plate cam 36a moves to the left in the figure so that the shift pin 33 follows the straight-line guide channel 43 to reach the position $m_7$, shown in FIG. 8(a). If the gear wheels 94a and 94b turn further, the work pin 96b is freed from engagement and instead the work pin 96a engages with the cam hole portion 98an, and the drive lever 56 therefore rotates in the counterclockwise direction and the plate cam 36a stops, in which state the plate cam 38a moves to the right and the shift pin 33 rises in the straight-line guide channel 43 to the position $m_9$. This process (the process of one rotation of the gear wheels 94a and 94b) is one cycle, and the drive levers 56 and 60 as well as the plate cams 36a and 38a return to the positional relationships they had in FIG. 8 (a). In this way, the motion of the drive levers is reversed successively at each quarter turn of the gear wheels.

Meanwhile, pulses caused by the turning disk 102 are generated every eighth of a turn and the stop signal for the drive device is of the same period as the pulse generating positions, and therefore the drive levers 56 and 60 can be stopped even in the middle within a movable area thereof. This is to say, by continuing to turn the gear wheel 94a, for example in the counterclockwise direction, the drive levers 56 and 60 can repeat the process described above and the shift pin 33 can continue to rise incrementally from the bottom-most level position $m_1$ to the top-most level position $m_{24}$ (FIG. 5). Also, by turning the gear wheel 94a in the clockwise direction, the shift pin 33 can be made to move downward whenever required. Because the shift pin 33 is directly linked and integral with the disk selection and play-back means, the disk selection and play-back means can be moved accurately to the level of the required disk by making the position $m_x$ (X=1 to 24) correspond to the disk housing level and stopping the gear wheels from turning in the desired position whenever required.

Further, the movement of the lift panel 30 is described with reference to FIG. 5. It is assumed that the lift panel 30 is initially in the bottom position $m_1$(marking=1 on the indicator 26, referred to as "marking=1" hereinbelow). The gear wheel 94b is turned through an interval of 1 pulse (one eighth of a turn) and, when the next small hole 104 is directly opposite the photoelectric element 106 and the next pulse is generated, the second plate cam 38a (referred to as the "cam 38a " hereinbelow) is stopped, in which state the first plate cam 36a (referred to as the "cam 36a" hereinbelow) is moved in the direction of the arrow R so that the shift pin 33 enters the horizontal region of the step 66 and stops rising in the half stroke position. At this time, the position where the shift pin 33 engages with the cam channel 40a is $m_2$, and the shift pin 33 is positioned at marking=2. After the next one eighth turn of the gear wheel 94b, the cam 36a moves in the direction of the arrow R until the full stroke is reached, the position where the shift pin 33 engages with the cam channel 40a is $m_3$, and the shift pin 33 is positioned in marking=3. The next small hole 104 on the turning disk 102 comes directly opposite the photoelectric element 106 and 1 pulse is counted. During this action, the cam channel 42a formed on the cam 38a is in a position 75 at which it does not interfere with the movement of the shift pin 33.

After the next one eighth turn of the gear wheel 94b, the cam 36a stops, in which state the cam 38a is moved in the direction of the arrow L so that the shift pin 33 is in the position $m_4$ of engagement with the cam channel 40a on the horizontal portion of the cam channel 42a, and is in the position marking=4, in the half stroke position. After a further one eighth turn of the gear wheel 94b, the cam 38a moves in the direction of the arrow L until the full stroke is reached, the position where the shift pin 33 engages with the cam channel 40a is $m_5$, the shift pin 33 is positioned in marking=5, and the small hole 104 generates the next pulse. Now, after the following one eighth turn of the gear wheel 94b, the cam 38a stops and, with the cam 36a in the half stroke position, the shift pin 33 engages in the position $m_6$ on the horizontal portion in step 70 of cam channel 40a, and reaches the position of marking=6. Thereupon, the gear wheel 94b makes a further one eighth turn, the cam 36a moves to a full stroke, and the shift pin 33 engages in position $m_7$ on cam channel 40a to reach the position marking=$E_1$. During this operation as well, the cam channel 42a of the cam 38a is in a position at which it does not interfere with the movement of the shift pin 33 at all.

In this way, the shift pin 33 advances by increments in one direction in the straight-line guide channel 43. The procedure described above can be reversed to advance the shift pin 33 in the other direction. Markings=1 to 6 correspond to housing levels of disks 27 in the lower level magazine 18, and a disk 27 can be extracted from its housing position, played and then returned to its housing position after use by a known means by operating an operating key 50 on the disk extraction lever 48 by giving a command from the operating panel 14 to the lift panel 30, which is at the same level as the required disk 27, after having stopped the shift pin 33 in the required level position and locked it in that position by a separately provided means.

By a similar subsequent operation of spinning the gear wheel 94b in one direction in one eighth turns, the cam 36a first stops, the cam 38a moves half a stroke in the direction of the arrow R, and the shift pin 33 comes to be positioned at marking=$E_2$ in the position $m_8$ of engagement with the cam channel 40a in the horizontal portion of the cam channel 42a, whereupon a pulse is generated by a small hole 104 of the turning disk 102. After further moving the cam 38a in the direction of the arrow R for a full stroke, the position of engagement of the shift pin 33 with the cam channel 40a is $m_9$, it is positioned at marking=$E_3$, and a pulse is generated by a small hole 104 of the turning disk 102.

It should be noted that the drive mechanism described above controlled plate cams 36a and 38a which had cam channels 40a and 42a as depicted in FIG. 3, and when controlling plate cams having cam channels as depicted in FIGS. 4 (a) to (c), the pitch with which the small holes 104 provided in the turning disk 102 are formed should be a pitch corresponding to the positions where the plate cams will stop.

As described above, in the disk-changing device according to the present invention, a stepped cam channel for incrementally moving a disk selection means is formed in a zig-zag shape, the operating stroke of the plate cam provided with the stepped cam channel is reduced, and it can be fully cope with miniaturization of the device even if the number of magazines is increased and the number of disks installed is increased.

Furthermore, because the disk selection means is arranged for direct visual confirmation from outside the device, an intervening signal transmission member is omitted and the device is not only freed from the troubles which these members can cause but it is also more economic because it does not entail the additional space and costs concomitant with increasing the number of disks.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A disk-changing device comprising:
    a housing means having a plurality of housing positions for housing disk-shaped recording media in each housing position;
    a loading means for selecting and loading a housed recording medium from a desired housing position in the housing means;
    a plurality of plates which move the loading means between each of the housing positions, a zigzag shaped cam is formed in each plate to cooperatively provide a backswitching stepped form;
    pin-shaped cam followers are provided on the loading means and inserted in the zigzag shaped cams; and
    a movement means for reciprocally moving the plurality of plates with a predetermined timing with the result that it moves the loading means in a direction perpendicular to a direction of reciprocal movement of the plurality of plates, the cam followers moving along the zigzag shaped cam in a unilateral direction perpendicular to the reciprocating movement of the plurality of plates, each of the zigzag shaped cams repetitively reversing direction as it extends across its plate and providing oppositely inclined sloping surfaces to sequentially drive the pin-shaped cam followers in a unilateral direction, whereby the pin-shaped cam follower is driven to move the loading means in a direction perpendicular to the direction of the reciprocating movement of the zigzag shaped cams, whereby recording members are stored at predetermined positions along this perpendicular direction.

2. The disk-changing device as claimed in claim 1, in which the number of the abovementioned pair of plates is two.

3. The disk-changing device as claimed in claim 1, in which the direction in which the housing positions are oriented and the direction of movement of the plates is traverse to each other.

4. The device as claimed in claim 1, in which the movement means includes a turning drive device, and a link mechanism connecting the turning drive device with the plurality of plates.

5. The disk-changing device as claimed in claim 1, in which intervals of the arrangement of the housing positions are equal.

6. The disk-changing device as claimed in claim 1, further including a recognition means for recognizing the position of the a loading means in the direction of movement.

7. A disk-changing device comprising:

a housing means having a plurality of housing positions arranged sequentially in a first direction, for housing disk-shaped recording media in each housing position;

a loading means for loading a housed recording medium from a desired housing position in the housing means and performing a predetermined operation on the data recorded thereon;

two plates which move the loading means between each of the housing positions with a reciprocal movement, a first zigzag shaped cam surface in one plate and a second zigzag shaped cam surface in the other plate, each cam surface being positioned to collectively provide a backswitching stepped form of operation;

pin-shaped cam followers are operatively connected to the loading means and are constructed in such a way as to be inserted in the zigzag shaped cams;

a movement means for reciprocally moving the plurality of plates with a predetermined timing with the result that it moves the loading means in a unilateral direction perpendicular to the direction of movement of the plurality of plates, each of the zigzag cam surfaces repetitively reverse direction as it extends across its plate and providing oppositely inclined sloping surfaces to sequentially drive the pin-shaped cam followers in a unilateral direction, whereby the movement means is driven to move the loading means in a direction perpendicular to the direction of the reciprocating movement of the plates, whereby recording members are stored at predetermined positions along this perpendicular direction; and a recognition means for determining the position of the loading means relative to the housing positions.

8. A disk-changing device comprising:

means for storing a plurality of disk-shaped recording members at discrete positions;

means for loading and unloading disk-shaped recording members into the discrete positions;

at least a pair of cam members that are mounted for reciprocating movement, each cam member having a backswitching stepped cam path that can selectively overlap the other cam path;

cam follower means operatively connected to the means for loading and unloading and engaging the cam paths of the cam members, each of the cam paths repetitively reversing direction as it extends across the cam member and providing oppositely inclined sloping surfaces to sequentially drive the cam follower means in a unilateral direction; and movement means for reciprocally moving the cam members to progressively cause the cam members to increase an overlap of each other and subsequently to decrease the overlap of each other, whereby the cam follower means is driven to move the means for loading and unloading in a direction perpendicular to the direction of the reciprocating movement of the cam members, whereby recording members are stored at predetermined positions along this perpendicular direction.

9. The disk-changing device of claim 8, wherein the movement means includes a guide channel for contacting the cam follower means to provide the perpendicular direction.

10. The disk-changing device of claim 8, wherein the movement means includes a drive source, a pair of drive cam members operatively connected to be driven by the drive source and in turn operatively connected to the pair of cam members, the drive cam members being interconnected to be displaced relative to each other in two separate directions to progressively cause a cam path on one cam member to progressively advance the cam follower means followed by the other cam path on the other cam member continuing the progressive advancement of the cam follower means.

11. The disk-changing device of claim 8, wherein each of the cam paths defines a zigzag configuration.

12. The disk-changing device of claim 8, wherein each cam member is a flat plate with a central zigzag cam path extending from approximately one side of the plate to the other side of the plate.

13. A disk-changing device comprising;

a housing means having a plurality of housing positions for storing disk-shaped recording media;

a loading means for selecting and loading a disk-shaped recording media in the housing position;

a pair of cam members, each having a cam surface configured to provide a backswitching step when relatively moved;

a cam follower mounted for contact with each of the cam surfaces and operatively mounted to the loading means; and drive means for driving the respective pair of cam members in a reciprocating movement wherein the cam surfaces have aligned backswitching stepped shapes, each of the cam surfaces repetitively reversing direction as it extends across the cam member and providing oppositely inclined sloping surfaces to sequentially drive the cam follower in a unilateral direction, whereby the cam follower is driven to move the loading means in a direction perpendicular to the direction of the reciprocating movement of the cam members, whereby recording members are stored at predetermined positions along this perpendicular direction.

* * * * *